United States Patent [19]
Fleischer

[11] Patent Number: 5,580,681
[45] Date of Patent: *Dec. 3, 1996

[54] SOLID STATE ELECTROCHEMICAL CELL

[75] Inventor: Niles A. Fleischer, Rehovot, Israel

[73] Assignee: E.C.R.-Electro-Chemical Research Ltd., Yavne, Israel

[*] Notice: The term of this patent shall not extend beyond the expiration date of Pat. No. 5,382,481.

[21] Appl. No.: 399,017

[22] Filed: Mar. 6, 1995

Related U.S. Application Data

[63] Continuation-in-part of Ser. No. 208,326, May 2, 1994, Pat. No. 5,512,391, which is a continuation-in-part of Ser. No. 128,497, Sep. 7, 1993, Pat. No. 5,382,481.

[51] Int. Cl.$^6$ .............................. H01M 10/40; H01M 4/60
[52] U.S. Cl. ...................... 429/192; 429/213; 429/220; 429/221; 429/224
[58] Field of Search ........................ 429/33, 192, 213, 429/105, 106, 107, 109, 193, 220, 221, 224

[56] References Cited

U.S. PATENT DOCUMENTS

| | | | |
|---|---|---|---|
| 2,306,927 | 12/1942 | Arsem . | |
| 2,874,079 | 6/1956 | Lozier et al. . | |
| 3,025,336 | 2/1961 | Bartosh et al. . | |
| 4,024,036 | 5/1977 | Nakamura et al. | 204/129 |
| 4,366,216 | 12/1982 | McGinness | 429/213 |
| 4,380,575 | 4/1983 | Nakamura et al. | 429/13 |
| 4,504,557 | 3/1985 | Filatovs et al. | 429/192 |
| 4,554,224 | 11/1985 | Nakamura et al. | 429/30 |
| 4,594,297 | 6/1986 | Polak et al. | 429/13 |
| 4,664,761 | 5/1987 | Zupancic et al. | 204/129 |
| 4,847,174 | 7/1989 | Palmer et al. | 429/112 |
| 4,894,301 | 1/1990 | Dyer . | |
| 4,902,579 | 2/1990 | Grasselli et al. | 428/610 |
| 5,071,720 | 12/1991 | Notten | 429/101 |
| 5,135,589 | 8/1992 | Fetcenko et al. | 148/442 |
| 5,188,768 | 2/1993 | Sotomura | 252/518 |
| 5,232,795 | 8/1993 | Simon et al. | 429/192 |
| 5,382,481 | 1/1995 | Fleischer | 429/192 |
| 5,429,895 | 7/1995 | Lian et al. | 429/221 X |

OTHER PUBLICATIONS

R & D Magazine, Feb. 1993 p. 28.
Alt, H. et al, "Investigation Into the Use of Quinone Compounds for Battery Cathodes", Elch. Acta 17 (1972) 873 Month unknown.
Beck, F. et al, "Metalfree Rechargeable Batteries", The Electrochemical Society Abstracts, No. 152, Oct., 1994 Meeting.
Udhayan, R. et al, "Evaluation of Open Circuit Voltage and Corrosion Rate in Magnesium/N–Halogen Organic Cells", J. Electrochemic. Soc. 140, No. 4, L.58–60 (1993) Month unknown.
Glicksman, R. et al, "Investigation of the Electrochemical Properties of Organic Compounds",J. Electrochemic. Soc. 105 pp.299–306 (1958) Month unknown.
Morehouse, C. K. et al "Dry Cells Containing Various Nitro Compounds as Cathode Materials", J. Electrochemic. Soc 105 pp. 306–311 (1958) Month unknown.

*Primary Examiner*—Stephen Kalafut
*Attorney, Agent, or Firm*—Mark M. Friedman

[57] ABSTRACT

An all solid state battery power source which operates efficiently at room temperature. The battery includes (1) a solid state electrolyte in which protons are mobile, (2) an anode active material based on an organic compound which is a source of protons during battery discharge, or an anode active material including a metal whose cation can assume at least two different non-zero oxidation numbers and (3) a solid cathode including a compound which forms an electrochemical battery couple with the anode. Anode and cathode active materials can be chosen so that the battery has the feature that the electrochemical reactions at the anode and cathode are at least partially reversible. It is suitable for electronic consumer products, biomedical applications, electric vehicle applications, and the like. The battery can be fabricated in any desired shape without any special production precautions.

40 Claims, 1 Drawing Sheet

U.S. Patent     Dec. 3, 1996     5,580,681
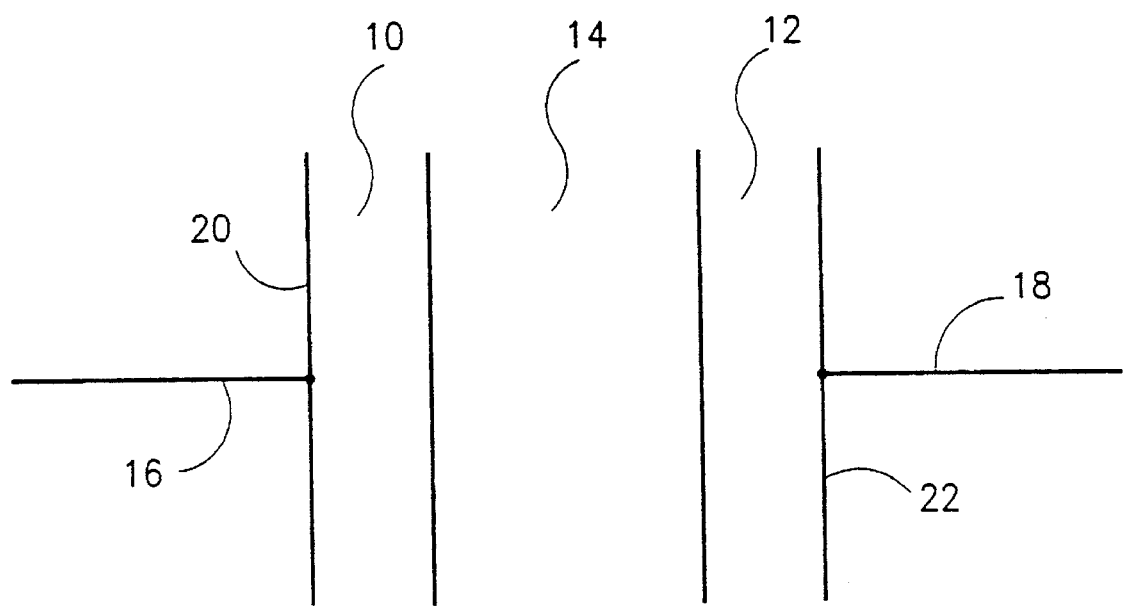

SOLID STATE ELECTROCHEMICAL CELL

This is a continuation-in-part of U.S. patent application No.08/208,326 filed May 2, 1994 now U.S. Pat. No. 5,512, 391, which is a continuation-in-part of U.S. Ser. No. 128, 497, filed Sep. 7, 1993, now U.S. Pat. No. 5,382,481, issued Jan. 17, 1995.

FIELD AND BACKGROUND OF THE INVENTION

This invention relates to electrochemical cells which are used as battery power sources by converting chemical energy to electrical energy. More particularly, this invention relates to batteries which accomplish the conversion of chemical energy to electrical energy by using a solid state electrolyte in which protons are mobile.

Batteries have been developed which contain a solid rather than liquid electrolyte, since these exhibit practical advantages such as a high form factor, thin, flat, flexible shapes and avoidance of fluid leakage or drying out. However, such batteries generally employ electrodes composed of metals, such as palladium (see for example U.S. Pat. No. 4,894,301), which are expensive or materials which may be dangerous to health and difficult to manufacture.

In the past, aromatic nitro compounds were considered for active battery cathode materials in non-rechargeable batteries and only for liquid aqueous electrolytes (see for instance U.S. Pat. 2,306,927, Dec. 29, 1942, U.S. Pat. No. 3,025,336, Mar. 13, 1962, R. Glicksman and C. K. Morehouse, J. Electrochem. Soc., 105 (1958) 299 and R. Udhayan and D. P. Bhatt, J. Electrochem. Soc., 140 (1993) L58). Since these compounds are reduced irreversibly under these conditions, they are not suitable for rechargeable batteries. In addition, these compounds suffer from one or more of the following deficiencies: low cell voltages, toxic, significant solubility in the electrolyte, instability with regards to the electrolyte, poor shelf-life, high self-discharge, and low power density.

Further prior art considered the halogenated organic compounds for active battery cathode :materials because of their generally higher voltage but only in non-rechargeable batteries and only for liquid aqueous electrolytes (U.S. Pat. No. 2,874,079, Feb. 17, 1959 and R. Udhayan and D. P. Bhatt, J. Electrochem. Soc., 140 (1993) L58). Besides the disadvantages mentioned above for the aromatic nitro compounds, the halogenated compounds also suffer from being corrosive, give chlorine odors and are difficult to handle. In still more recent prior art, some aromatic quinone compounds have been used as anodes in liquid aqueous electrolyte batteries (see for instance H. Alt, et. al., Electrochim. Acta, 17 (1972) 873 and F. Beck, et. al., The Electrochemical Society Abstracts, No. 152, October 1994 Meeting). However inherent deficiencies limit their applicability in practical batteries. These electrode materials are not stable with respect to the liquid electrolyte and so they degrade. In addition, these electrode materials are soluble in liquid electrolytes and so the integrity of the electrodes is significantly diminished and there is high self-discharge and poor shelf life. Furthermore, they are not useful in practical batteries because their voltages are generally too low.

SUMMARY OF THE INVENTION

The invention serves to provide a battery containing a solid proton conductor electrolyte, in which there is employed an anode free of metals and metal alloys and which contains a solid organic compound which is a source of protons during discharge, thus achieving the advantages of solid electrolytes and avoiding the disadvantages of metal-containing proton-donating anodes.

Thus, in accordance with the invention, there is provided a battery comprising an anode, a cathode and a solid state proton-conducting electrolyte between, and in contact with, the anode and cathode, wherein:

(a) the anode includes an organic compound which is a source of protons during discharge;

(b) the cathode includes a compound which forms an electrochemical battery couple with the anode; and (c) the electrolyte contains a solid material in which protons are mobile.

According to a preferred embodiment of the invention, the organic compounds in the anodes include aromatic, non-aromatic ring and chain compounds.

In an electrochemically rechargeable version of an electrochemical cell according to the present invention the anode and cathode active materials are specifically chosen so that the solid cathode active component reacts at least partially reversibly during battery operation and the solid anode active component is capable of providing hydrogen ions in an electrochemical reaction to produce electrical energy during battery discharge and to accept hydrogen ions during battery charging.

The present invention also provides a battery containing a solid proton conductor electrolyte employing an anode which includes a solid material containing a metal cation which can assume at least two different non-zero oxidation numbers.

Thus, in accordance with another embodiment of the invention, there is provided a battery including an anode, a cathode, and a solid state proton-conducting electrolyte between, and in contact with, the anode and cathode, wherein:

(a) the anode includes a material which contains a metal cation which can assume at least two different non-zero oxidation numbers;

(b) the cathode includes a compound which forms an electrochemical battery couple with the above anode;

(c) the electrolyte includes a solid material in which protons are mobile.

In an electrochemical rechargeable version of an electrochemical cell according to the present invention, the anode and cathode materials are specifically chosen so that each reacts at least partially reversibly during battery operation.

While electrochemical reactions involving the reversible dissociation of hydroquinone into quinone, protons and electrons and methylene blue oxidized to yield a proton and an electron are known, these reactions have been carried out using the hydroquinone or methylene blue as dissolved substances in a liquid electrolyte. The application of solid proton-donating organic compounds in electrochemical reactions using a solid electrolyte as the proton-conducting medium, and especially as anodes in solid state rechargeable battery applications, are :not known in the prior art.

The present invention solves the deficiencies of the prior art, and thereby distinguishes itself from the prior art, by using a solid electrolyte in conjunction with organic compounds successfully in a rechargeable battery. The special combination of the organic compounds and solid state electrolyte of the present invention combines all of the following advantages: rechargeability, stable chemistry, non-toxic materials, non-corrosive materials, no chlorine odors, materials which are easy to handle and process, and materials which are insoluble in the solid electrolyte, have a high voltage and a high power density. This combination of desirable features could not have been predicted from the prior art nor was achieved by the prior art.

This invention is also an improvement over the prior art since high cell voltages are achieved with a solid state proton conducting electrolyte with non-corrosive, safe, chlorine-odor free, stable, insoluble, and non-toxic aromatic compounds. A cell exemplified in an embodiment of the present invention has a voltage above 1.1 volts and can be as high as about 1.3 volts, thus achieving the advantage of voltage levels which are practical for commercial batteries with electrodes containing advantageous organic compounds in conjunction with a solid state proton conducting electrolyte.

In conventional batteries based on proton reactions, such as nickel/metal hydride cells, hydrogen gas is stored as a hydride in a hydrogen storage alloy or hydrogen storage metal anode and converted to protons in an electrochemical battery discharge reaction. The protons are transferred to the cathode in a liquid electrolyte.

In the nickel/metal hydride technology, the hydrogen gas stored in the anode is desorbed and oxidized electrochemically to protons and electrons in the anodic discharge reaction. During charging, the hydrogen produced by water electrolysis is absorbed by the anode material. Disadvantages of such a battery include: flammable hydrogen gas can be released under certain conditions leading to possible explosions, pressure build-ups which require cell venting mechanisms, and other safety risks. The organic compounds of the present invention, on the other hand, react reversibly with protons without the involvement of a gaseous hydrogen phase thus achieving safety advantages and avoiding the disadvantages of the metal hydride technology batteries.

Some other of the disadvantages (see, for instance, A. Visintin, in Electrochem. Soc., vol. 139, 1992, p. 985) of the current metal/hydride batteries are their high self-discharge rate. In addition, since they have within partial pressures of hydrogen gas, they could pose a safety hazard. Also, cell assembly is complicated and made expensive since they may be pressurized and in some situations, high internal pressures are created.

The present invention possesses advantages over the conventional metal/hydride battery. For instance, since there is a solid electrolyte in a cell according to the present invention, there is no problem of cell leakage or drying out and no separators between the electrodes are required. Also, the cell operates at atmospheric pressure so cell design and assembly is less expensive, simpler and safer. Also, since the cell contains no hydrogen gas, the cell is inherently safer.

Many of the organic hydrogen redox materials are known as redox couples which are dissolved in aqueous or non-aqueous electrolytes. In the present invention, a distinguishing feature is that they are used as a hydrogen ion source in the solid state and the protons are transported in a solid state proton conductor electrolyte.

The organic hydrogen ion source materials of the present invention are distinct from previously known hydrogen storage compounds such as $PdH_x$ (U.S. Pat. No. 4,894,301) and metal alloy hydrides such as $LaNi_{4.7}Al_{0.3}$ (J. Electrochem. Soc., vol. 134, 1987, p. 558, T. Sakai, et al.), or $MmNi_{3.5}Co_{0.7}Al_{0.8}$ (Mm=mischmetal, composition on atomic percent: La - 25.4, Ce - 53.6, Pr - 5.4, Nd - 15.6, J. Electrochem. Soc., vol. 139, 1992, p. 172, N. Kuriyama, et al.). Similar effective compositions are also known such as $MmNi_{3.6}Co_{0.7}Al_{0.3}$ and alloys containing V, Ni, Ti, Zr and Co in various stoichiometries (U.S. Pat. No. 5,135,589). The prior art electrodes have the disadvantages of using expensive metals such as Pd, or metals dangerous to health like Ni and Co, or rare earth metals. Another disadvantage is the complicated metallurgy and manufacturing expense required to arrive at the proper composition of the metal alloy hydrogen storage electrodes. In addition, the prior art hydride electrodes are used in batteries which use a liquid electrolyte, typically aqueous KOH solutions.

Other advantages of the present invention include safer operation, the elimination of expensive hydrogen storage materials and the elimination of the need for loading the metal hydride under hydrogen pressure as in prior art technology.

BRIEF DESCRIPTION OF THE DRAWINGS

The invention is herein described, by way of example only, with reference to the accompanying drawing, wherein the sole Figure schematically depicts in cross-sectional view a battery according to the present invention showing an anode 10, a cathode 12 and an electrolyte 14, as well as a pair of leads 16 and 18 and, optionally, a pair of conducting plates 20 and 22.

DESCRIPTION OF THE PREFERRED EMBODIMENTS

The organic proton-donating anode material employed in accordance with one embodiment of the invention is an aromatic, non-aromatic ring or chain compound. The theoretical capacity of the anodic material will depend on its molecular weight and the number of active hydrogen ion sites. An active hydrogen ion site, for purposes of this invention, is capable of donating a proton during battery discharge. A hydroxy group is one example of such a site. Depending on the end-use applications, the choice of anode and cathode active materials, the type of ionically conductive electrode additives, and the type of electronic conductive electrode additives, can be chosen to best meet the requirements of the particular application of the invention.

The various possible anodic organic compounds include aromatic, non-aromatic ring, and chain molecules, with attached hydrogen ion sites which may, in addition, feature additional functional groups. Furthermore, one or more carbons in the molecule may be substituted with other constituents, such as sulfur, nitrogen or oxygen.

Certain of the aromatic compounds feature a benzene ring. For example, mono-hydroxy derivatives such as hydroquinone monomethyl ether, hydroxy acetophenone, hydroxybenzaldehyde, hydroxy benzoic acid, hydroxybenzonitrile, acetaminophen, hydroxybenzyl alcohol, hydroxycinnamic acid and methylparabin; di-hydroxy derivatives, such as 2,5-dihydroxy-1,4-benzoquinone, resorcinol, ascorbic acid and its derivatives, 1,4-dihydroxy benzene (hydroquinone), 3-hydroxy tyramine (dopamine), rhodizonic acid, and co-enzyme $Q_n$, where n, the length of the isoprenoid chain attached to the benzoid ring, is in the range of from 1 to 10; tri-hydroxy derivatives such as 1,2,3-trihydroxy benzene (pyrogallol) and 1,3,5-trihydroxy benzene (phloroglucinol); tetra-hydroxy benzene derivatives such as tetrahydroxy quinone (THQ, also known as tetroquinone or tetrahydroxy-p-quinone) in its non-hydrated, dihydrate and hydrated forms, with the dihydrate being preferred, tetrahydroxy acetophenone and tetrahydroxy benzoic acid; hexahydroxy benzene derivatives such as hexahydroxy benzene.

Other of the aromatic compounds are condensed or fused polycyclic aromatics in which adjacent rings share two carbons. For example, bi-cyclic naphthalene derivatives such as :mono-hydroxy derivatives like naphthols, 1-nitroso-2-napthol, martius yellow, and hydroxy- 1,4-naphthaquinone, di-hydroxy derivatives such as naphthalene diols, tetrahydroxy derivatives such as tetrahydroxy napthalene and tetrahydroxy 1,4-naphthaquinone, and pentahydroxy naphthaquinones such as echinochrome and pentahydroxy 1,4-naphthaquinone. Other examples are tri-cyclic anthracene derivatives such as mono-hydroxy derivatives like anthranol and hydroxy anthraquinone, di-hydroxy derivatives like anthralin, anthrarufin, alizarin and di-hydroxyanthraquinone, tri-hydroxy derivatives like anthrobin, anthragallol, purpurin and 1,8,9-anthracenetriol, and tetrahydroxy derivatives like 1,2,5,8-tetrahydroxyanthraquinone and carminic acid. Still other examples are bi-cyclic derivatives such as purpogallin.

Further aromatic compounds are biaryls, benzoid compounds in which benzene rings or condensed systems are attached by a bond, such as hydroxybenzophenone, hydroquinone monobenzylether, hydroxy biphenyl, 2,2,4,4,-tetrahydroxy benzophenone, phenolphthalein, indophenol, bromophenol blue, methylenedigallic acid and methylenedisalicyclic acid, or compounds having an oxygen substituting for a carbon in an aromatic ring like 5-hydroxy-2(5H)-furanone, hydroxycourmarin and fustin, or a nitrogen substituted aromatic ring like the multi-cyclic hydroxindole, tetrahydro papaveroline, oxindole, o-phenanthroline in its hydrated and unhydrated forms, phenanthridine, 6(5H)-phenanthridinone, and hydroxyjulolidine and the single-ringed N-hydroxymaleimide, citrazinic acid, uracil, 2-amino-5-bromopyridine, 5-aminotetrazole monohydrate, 2-aminothiazole, 2-aminopyrimidine, 2-amino-3-hydroxypyridine, 2,4,6-triaminopyrimidine, 2,4-diamino-6-hydroxy pyrimidine, 5,6-diamino- 1,3-dimethyluracil hydrate, 5,6-diamino-2-thiouracil, cyanuric acid, cyanuric acid compound with melamine, and hydroxy methyl pyridine.

Certain of the compounds are based on a 4-membered aromatic ring. For example, squaric acid. Certain of the compounds are based on a 5-membered aromatic ring such as croconic acid, reductic acid, 5-methyl reductic acid, and other reductic acid derivatives. Other compounds include calix(4)arene.

Methylene blue is a known redox material which reacts reversibly with protons in electrochemical redox reactions. The successful use of methylene blue as an anode-material (see Example 7 below) teaches that the reversible redox of protons in a solid state battery according to the present invention is not limited to hydroxy-substituted aromatic compounds such as those listed above but is a broader behavior of several types of aromatic proton-donating materials such as, but not limited to, the amino substituted compounds listed above as well as 1,2-diaminoanthraquinone and 3-amino-2-cyclohexen-1-one.

It is to be understood that the aforementioned listing of aromatic solid organic compounds for the solid state anode is only representative of the class of hydrogen ion sources which are contemplated for use as the active organic material in the anode of the present invention. Any solid organic substances capable of acting as a source of protons in an electrochemical reaction at the anode of a battery power source for conversion of chemical energy to electrical energy may be used as the active component for the anode in such a battery.

The aromatic ring compounds of this invention have similar analogues which are non-aromatic ring compounds. In an alternative embodiment of this invention, non-aromatic proton-donating ring compounds can be used in the anodes as the active material. The non-aromatic proton-donating ring compounds are similar to the aromatic ring compounds except that they do not have aromaticity. Suitable non-aromatic proton-donating compounds include, but are not limited to, 6-membered ring compounds such as pentahydroxy cyclohexanonthiosemicarbazon, pentahydroxy cyclohexanon diethyl thioacetal, and 2,3,5,6 tetrahydroxy cyclohexane-1,4 dione, tri-keto-tri-hydroxy cyclohexane, inositol, scyllo-Inosose, uramil, urazole, chloroanilic acid, and quinic acid, as well as octahydroxy cyclobutane.

Similarly, the proton-donating ring compounds of this invention have similar analogues which are non-ring compounds having the same proton-donating groups. In an alternative embodiment of this invention, solid state proton-donating chain compounds can be used in the anodes as the active material. The proton-donating chain compounds are similar to the aromatic and non-aromatic ring compounds in the respect that they contain the same proton-donating groups like hydroxy groups. Non-limitative examples of such chain proton-donating compounds include mucic acid and meso-erythritol.

In yet another alternative embodiment of this invention the anode includes a compound containing a metal whose cation can assume at least two different non-zero oxidation numbers. Preferably the standard reduction potential of the electrochemical reaction between the two oxidation states of the metal cation of the compound is such that, when the anode containing this compound is coupled with a cathode of this invention, the resulting battery has a useful voltage level. In a preferred embodiment of this invention the anodic compound contains a metal M where M is selected from the group consisting of Sn, Ti, Cu and Cr, and of these, Cr and Sn are the most preferred.

In one embodiment of this invention, the initial oxidation number of the metal cation is a lower oxidation number of the possible non-zero oxidation numbers for that metal cation. In this situation, the battery made from such an anode containing a compound with a metal cation in its lower oxidation state, coupled with a cathode of this invention, may be directly discharged after construction. In another embodiment, the initial oxidation number of the metal cation is one of the higher oxidation numbers of the possible non-zero oxidation numbers for that metal cation. In this situation, the battery made from such an anode containing a compound with a metal cation in one of its higher oxidation states, coupled with a cathode of this invention, may be charged after construction in order to gain maximum useful energy from the battery.

Some of the active compounds to be used in the anode of this invention are known to occur in various hydrate forms. The non-hydrated and all of the hydrated forms, where relevant, of all of these compounds are considered to be within the scope of this invention and are useful in the anodes of the present invention.

The cathode may be made from one or more of a number of materials including, but not limited to, $WO_3$, transition metal dioxides $MO_2$ (where M=Mn, Mo, Ir, Cr, Ti, Nb, V, or W), $V_2O_3$ and related vanadium oxides, NiOOH, $Ni(OH)_2$, $(CF)_x$, $(C_2F)_x$ and naphthalene. Manganese dioxide useful in the cathode of this invention may include various grades of electrolytic or chemical manganese dioxide, with the untreated electrolytic form being preferred, or may include heat treated electrolytic and chemical manganese dioxide which is heated at about 375° C. for several hours in air and is then oven cooled.

Further compounds include mono- and divalent silver oxide, tantalum oxide, and molybdenum trioxide. Additional compounds include transition metal dichalcogenides, such as metal sulfides $MS_2$ (where M=Mo, Ti, Ta, V, Zr, Hf) and metal selenides $MSe_2$ (where M=Zr, Hf, Nb, V, Ta, Ti, Mo, W) and niobium triselenide. Still further compounds include layered perovskites and layered compounds which contain perovskite sub-structures such as but not limited to $Bi_2Sr_2CaCu_2O_{8+y}$, $Bi_2Sr_2Cu_1O_{6+y}$, and $YBa_2Cu_3O_7$. Yet further compounds include fullerenes like the 65 carbon fullerite.

Other cathodic active compounds include triquinoyl (also known as hexaketocyclohexane and cyclohexane-hexone) in its non-hydrated, hydrated, dihydrate and octahydrate forms, and leuconic acid in its non-hydrated, hydrated and pentahydrated forms.

Further compounds include pseudothiohydantoin, 3-sulfolene, uric acid, hydantoin, barbituric acid, glycine anhydride, 2,4- thiazolidinedione, thioxanthen-9-one, 5-nitrouracil, glutarimide, parabanic acid, 1,5-dihydropyrimidol-[5,4-d]-pyrimidine-2,4,6,8(3H, 7H)-tetrone, thiotetronic acid, 2,4,6 triaminopyrimidine, o-phenanthroline monohydrate, dehydro ascorbic acid dimer, 1,3 dichloro-5,5 dimethyl hydantoin, anthraquinone, quinone, anthracene, dichloromaleic anhydride, 3,5,dinitro benzoic acid, tetrachlorophthalic anhydride, chloranil, 2-ethyl anthraquinone and other alkyl anthraquinones, duroquinone, succinimide, 2,3-dichloro 5,6-dicyano 1,4-benzoquinone, 4(6)-amino uracil and hydrindantin.

Yet further compounds include salts of the rhodizonic acid and tetrahydroxy quinone compounds including the di-potassium salts and di-sodium salts of rhodizonic acid and tetrahydroxyquinone.

Yet further compounds include tri-chloro cyanuric acid, cyanuric chloride, cyanuric acid anhydrous, di-chloro iso-cyanuric acid, di-chloro isocyanuric acid lithium, potassium or sodium salt, trichloro isocyanuric acid, trichloromelamine, hexachloromelamine, N-chloro-succinimide, succinimide, succinic anhydride, m-dinitrobenzene, 2,4-dinitrophenol, picric acid, 4-nitrosophenol, p-quinone-dixime, dichlorobenzoquininediimine, N,N-dichloro-dimethyl-hydantoin and other N-halogen organic compounds and other aromatic nitro compounds.

Yet further compounds include substituted biureas such as referred to in U.S. Pat. No. 3,481,792 which is incorporated by reference as if fully set forth herein. Yet further compounds are substituted azodicarbonamides such as referred to in U.S. Pat. No. 3,357,865 which is incorporated by reference as if fully set forth herein.

In an alternative embodiment of this invention, the cathode includes a compound containing a metal whose cation can assume at least two different non-zero oxidation numbers. Preferably the standard reduction potential of the electrochemical reaction between the two oxidation states of the metal cation of the compound is such that, when the cathode containing this compound is coupled with an anode of this invention, the resulting battery has a useful voltage level.

In a preferred embodiment of this invention, the cathodic active compound contains a metal M, where M is selected from the group consisting of Mn, Ce, Fe, or Co and, of these, Mn is the most preferred. In one embodiment, the initial oxidation number of the metal cation is a lower oxidation number of the possible non-zero oxidation numbers for that metal cation. In this situation, the battery made from such a cathode containing a compound with a metal cation in its lower oxidation state, coupled with an anode of this invention, may be first charged after construction before discharge in order to gain maximum useful energy from the battery. In another embodiment, the initial oxidation number of the metal cation is one of the higher oxidation numbers of the possible non-zero oxidation numbers for that metal cation. In this situation, the battery made from such a cathode containing a compound with a metal cation in one of its higher oxidation states, coupled with an anode of this invention, may be discharged after construction in order to gain maximum useful energy from the battery.

The cathode of the metal cation embodiment may include one or more of a number of materials including but not limited to: M acetate, M bromide, M carbonate, M chloride, M citrate, M fluoride, M iodide, M molybdate, M nitrate, M oxalate, M orthophosphate, M selenate, M sulphate, and M tungstate. In these materials, M can be as follows: M=Ce(III), and in the case of fluoride and sulphate also Ce(IV); M=Co(II), and in the case of acetate, chloride, fluoride and sulphate also Co(III); M=Mn(II), and in the case of acetate, chloride, fluoride and sulphate also Mn(III). III and II represent the oxidation number of the metal cation. Other compounds include:

M lactate where M=Mn (II)

M metaphosphate where M=Ce(III)

M tantalate where M=Mn(II)

M titanate where M=Mn(II)

Yet further compounds include the following Mn(II) compounds: Mn di-hydrogen orthophosphate, Mn mono-hydrogen orthophosphate, Mn pyrophosphate, Mn hypophosphite, Mn orthophosphite. Yet further compounds include the following Mn(III) compounds: Mn orthophosphate and Mn metaphosphate.

Various compounds listed above in the alternative embodiment for the metal cation are known to occur in various hydrate forms. All of the hydrated forms of these compounds are considered to be within the scope of this invention. As a non-limitative example, Mn sulphate has the following hydrated forms: $MnSO_4$-x $H_2O$ where x is an integer in the range of from 0 to 7, all of which are suitable cathode materials according to the invention. Most preferably, the cathode includes $MnSO_4$-x $H_2O$ where x is zero or one.

In the prior art, compounds such as $MnPO_4$ have been used in battery cathodes but only with aqueous liquid electrolytes. Cathodes such as $MnPO_4$ are not suitable for long life liquid electrolyte batteries. For instance, $MnPO_4$ is not stable in such aqueous electrolytes and decomposes. Many metal salts are soluble in a liquid electrolyte and so the integrity of electrodes incorporating these soluble salts in liquid electrolyte batteries is significantly diminished. In the present invention, the combination of the metal salts listed above with a solid state electrolyte eliminates these problems.

In an alternative version of the metal cation embodiment of this invention for anodes and cathodes, a cation or anion exchange material in the form of a sheet or resin or ion adsorber material is mixed with the materials of the cathode or anode mix or alternatively is positioned between the anode and the cathode. The ion exchanger is a natural or synthetic substance. Ions attached to the exchanger can be exchanged for equivalent amounts of other ions of the same charge. The adsorber resins are polar in character and adsorb ions. Common cation exchange materials are styrene or acrylic-based materials that are of the gel or macroreticular type. They can be produced, for example, by sulfonating cross-linked polystyrene. It is common to cross-link them with divinylbenzene.

In a preferred embodiment of this invention, strong cation exchangers of the $H^+$ form are used.

In an alternative embodiment, the cation exchanger or adsorber material is treated with an aqueous solution of an appropriate metal salt.

In the case of using these solution treated cation exchange materials in cathodes, an aqueous solution of Mn, Fe, Ce and Co salts can be used, with Mn being preferred. In a preferred embodiment, an aqueous solution of Mn sulphate is poured through a bed of a strongly acidic $H^+$ form cation exchanger. The divalent Mn cation replaces protons in the cation exchanger. The ion exchanger can be rinsed with water afterwards and dried. The cation exchanger treated with the aqueous Mn sulphate solution is used in cathodes.

In an analogous fashion, in the case of using the cation exchange materials in anodes, an aqueous solution of Sn, Ti, Cu, and Cr salts can be used, with Cr and Sn being preferred. The treated ion exchanger is used in the anode.

To one skilled in the art it will be obvious that any appropriate solvent-solute solution containing metal salts can be used to treat the cation exchanger and that various methods are available to exchange cations into the cation exchanger. In addition, various types of cation exchangers can be used, of various forms, shapes, and sizes and chemical composition and degree and type of cross-linking.

In an alternative version of the metal cation embodiment for anodes and cathodes, a chelating agent may be added to the electrode mix containing the metal cation compound. Metal cations will commonly form a complex with many chelating agents. In a preferred embodiment, a complex agent is added to the cathode mix in order to complex the manganese cation. Non-limitative examples of chelating agents include malonic acid, oxalic acid, ethylene diamine tetraacetic acid (EDTA), and benzoyltrifluoroacetone.

Active compounds to be used in the cathode of this invention are known to occur in various hydrate forms. The non-hydrated and all of the hydrated forms of these compounds, where relevant, are considered to be within the scope of this invention.

For one skilled in the art, it will be obvious that the compounds of this invention used in the anode which have both proton-donating and proton-accepting groups (for instance, but not limited to, tetrahydroxyquinone, reductic acid and rhodizonic acid), can also be used in the cathode when coupled with an appropriate anodic material. This is because the proton-accepting groups of such a compound present in the cathode are available to accept protons during cell discharge.

Similarly, it will be obvious that the compounds of this invention used in the cathode which have both proton-donating and proton-accepting groups can also be used in the anode when coupled with an appropriate cathodic material. This is because the proton-donating groups of such a compound present in the anode are available to donate protons during cell discharge.

It is also a teaching of this invention that compounds of this invention used in the anode that have proton-donating groups which are capable of donating protons in an anodic discharge reaction can be converted to their discharged state (that is deprotonated) and used in the cathode when coupled with an appropriate anodic material. This is because the deprotonated groups become proton-accepting groups and when such compounds are used in the cathode these proton-accepting groups are available to accept protons during cell discharge. For instance, hydroquinone can be used in the form of quinone (protons are no longer present on the former hydroxy groups attached to the aromatic ring) in the cathode of this invention when coupled with an appropriate anodic active material of this invention. Similarly, as another non-limitative example, hexahydroxy benzene can be used in the form of triquinoyl in the cathode when coupled with an appropriate anodic active material of this invention.

It is also a teaching of this invention that the compounds used in the anodes of this invention can also be used in the cathode of this invention when coupled with an appropriate anode of this invention, if the resulting battery cell is first charged after construction before it is discharged.

It is also to be understood from this invention that the compounds of this invention that contain both proton donating and proton accepting groups (such as but not limited to tetrahydroxyquinone, reductic acid and rhodizonic acid) can be coupled with the appropriate cathodic active material and used in the anode in battery cells which may be either first discharged after construction, or coupled with the appropriate cathodic active material and may be first charged after construction before being discharged. In the situation where the cell is first charged, the proton accepting groups of such compounds accept protons during charging. The product of the charging reaction participates in the discharge reaction. As a non-limitative example, tetrahydroxyquinone in an anode, coupled with the appropriate cathodic active material of this invention, is reacted to hexahydroxybenzene in a two electron charging reaction. For an initial charge which goes to completion it is the hexahydroxybenzene product in the anode which is subsequently discharged. In another non-limitative example, rhodizonic acid in the anode, when coupled in a cell of this invention with the appropriate cathodic active material, is reacted to the tetrahydroxyquinone charge product in a two electron charging reaction and to the hexahydroxybenzene charge product in a four electron reaction.

It is also to be understood from this invention that proton accepting compounds used in the cathode in cells which are first discharged can alternatively be used in their discharged (that is protonated) state as the cathode active material, when coupled with appropriate anodes, in cells which are first charged after construction before discharge. As a non-limitative example, $Ni(OH)_2$, the protonated form of NiOOH, is used in the cathode and coupled with an appropriate anode of this invention. The resulting cell may be first charged after construction before being discharged to gain maximum useful energy.

It is also to be understood from this invention that proton donating compounds used in the anode in cells which are first discharged can alternatively be used in their discharged (that is de-protonated) state as the anode active material, when coupled with appropriate cathodes, in cells which are first charged after construction before being discharged, in order to gain maximum useful energy.

It is also a teaching of this invention that the compounds used in the anodes that contain both proton donating and proton accepting groups (such as but not limited to tetrahydroxyquinone, reductic acid and rhodizonic acid) can be used as an internal electrochemical over-charge buffer in a battery. Using tetrahydroxy quinone as a non-limitative example, in the case of over-charge, after the four initial hydroxy groups which were discharged have subsequently participated in the charge reaction to accept protons, the two quinone groups are available to react with additional protons that are transported to the anode during over-charge. Thus, these two quinone groups act as an internal proton reservoir for over-charge protection which prevents damaging side reactions.

It is a property of the solid state protonic conductor electrolyte used in the present invention to pass hydrogen ions and to have high protonic conductivity especially at room temperature. The electrolyte should also be at least partially stable towards the components of the anode, cathode and current collector.

It is known from the prior art that rechargeable batteries have been developed which contain a solid proton-conducting electrolyte rather than a liquid electrolyte. Such solid state batteries exhibit practical advantages such as avoidance of fluid leakage or drying out, no need for a separator between the electrodes, and lend themselves to be constructed into various shapes and flexible designs with simpler manufacturing technologies possible as compared to liquid electrolyte cells. Furthermore, solid state electrolyte batteries are generally considered to have good shelf life and storage stability.

Solid electrolytes of the present invention contain a solid material in which protons are mobile, such as, but not limited to, a heteropoly acid, for example, molybdophosphoric acid (MPA) or tungstophosphoric acid (TPA) or salts thereof or their respective hydrates at various states of hydration or mixtures of these. Other examples of suitable heteropoly acids are referred to in U.S. Pat. Nos. 4,024,036 and 4,594,297, which are incorporated by reference as if fully set forth herein. Some properties of MPA and TPA are described in Chemistry Letters, pp. 17–18, 1979, O. Nakamura, et al.

It is to be understood that the aforementioned listing of solid state protonic conductors are only representative of the class of solid materials in which protons are mobile which are contemplated to be employed in the solid state electrolyte of the present invention. A solid state material in which protons are mobile is defined for the purposes of this invention as a solid through which protons are transported. In addition, besides incorporating the solid electrolyte in raw form in the battery, it can be processed into gel form by using various gelling agents such as silica gels (see, Solid State Ionics 59 (1993) p. 171, M. Tatasumisago, et al.), or used in a polymer blend as in U.S. Pat. No. 4,594,297, or processed according to the methods given in the Examples below.

It is known from the prior art that a number of solid state proton conductors exist and some have been used in battery applications. MPA and TPA are among the highest conductivity solid state protonic conductors at room temperature. It is important to note that the prior art teachings of heteropoly acids refers only to their use in fuel cells. Prior art for their application in battery power sources is not known.

According to another embodiment of the invention, the solid electrolyte includes cation exchange materials. These cation exchange materials include their hydrogen ion forms. The cation exchangers include those based on chloro-sulfonated polyethylene, sulfonated polystyrenes, sulfonated polysulfones and copolymers of these materials, such as those based on divinylbenzene and sulfonated styrenes. These materials may have various degrees of cross-linking and exchange capacities. Other materials include Nafion (a trademark of DuPont for perfluoro-sulfonic acid cation exchanger), such as Nafion 112, 115 and 117, Flemion (a trademark of Asahi Glass Co. of Japan, which is similar to Nafion), cellulose acetate and cellulose triacetate membranes. The solid electrolyte can be incorporated in the battery between the electrodes as a film, assemblage of beads or membrane. In addition, the solid electrolytes containing the cation exchange or adsorber materials can be used in dry or wetted form. The cation exchanger may also be contained within the anode or cathode, such as in the form of beads or by applying them as a solution. Nafion, for example, is available as a solution. Alternatively, the ion exchange material can be an anion exchanger which does not block proton transport. Other ion exchange materials include the Selemion membranes of Asahi Glass Co. Ltd. of Japan.

In a preferred embodiment of the invention, the anode and the cathode contain their respective active electrode material and each further contains a non-metallic electrically conductive material, for example graphite or carbon black, and a solid state proton-conducting material such as a heteropoly acid, for example molybdophosphoric acid.

According to an alternative embodiment of the invention, a proton-conducting material contained in the anode and cathode can be a concentrated acid or aqueous solution of such an acid, for example, HCl, sulphuric acid, phosphoric acid, or nitric acid. In a preferred embodiment, concentrated sulphuric acid, in an amount in the range of from 5 to 35 weight per cent of the electrode mix, is added to the cell electrode mix, which consists of the active compound and a high surface area electrically conductive carbon. The treated electrode powder mix containing the acid solutions, active compound, and carbon has a free-flowing, dry appearance. While not wanting to be restricted to a certain conclusion, it is the interpretation of the data by the inventor that the dry appearance and free-flowingness of the electrode powder mix is a result of the acid being absorbed by the high surface area carbon electrically conductive material.

The solid state rechargeable batteries of the invention can easily be fabricated at ambient temperatures without any special precautions with regard to low humidity or oxygen-free atmospheres. They can be made, for example, by pressing powders, sequential deposition, contacting films to electrodes, casting of layers or printing in layers as by silk screening or computer designed printing, or a combination of such techniques. The battery may be made in any desired size and shape and several cells may be fabricated in series, in which case adjacent cells can be separated by a bipolar element, such as graphite, carbon black, or non-reactive metal.

When, after use, the battery has become discharged, recharging of the battery can be effected by applying an appropriate voltage or current across the cell.

The following non-limitative Examples illustrate the invention.

EXAMPLE 1

An anode mix was prepared by first mixing and grinding together at room temperature 0.5 g of graphite powder and 2.0 g of hydroquinone until a homogeneous mixture was obtained (A-1). To 0.105 g of A-1 were then added 150 mg of molybdophosphoric acid (MPA) powder to give a mixture (A-1-M) consisting by weight of 33% hydroquinone, 59% MPA and 8% graphite.

A cathode mix was prepared by first mixing and grinding together at room temperature 277 mg of graphite and 2.464 g of $MnO_2$ until a homogeneous mixture was obtained (C-1). To 0.106 g of C-1 were then added 148 mg of 38% $MnO_2$, 58% MPA and 4% graphite.

A battery cell was constructed by pressing in a cylindrical pellet die of 13 mm diameter made from an electrically insulating sleeve of polymethylmethacrylate plastics material and 316 stainless steel pellets. The insulating sleeve was necessary to prevent shorting out during pressing.

A first stainless steel pellet was loaded into the sleeve and a first 0.2 mm thick graphite sheet was then placed into the die to avoid contact between the MPA and the steel pellet and to provide a good surface for electrical contact to the external circuit. 0.124 g of A-1-M powder was then placed in the die on top of the graphite sheet. A second steel pellet was placed on top of the anode mix, which was then lightly pressed by hand. The second steel pellet was then removed and 0.277 g of MPA was added to completely cover the lightly pressed anode mix. The MPA was lightly pressed on to the anode mix using the steel pellet which was again removed and 0.124 g of cathode mix C-1-M was added to completely cover the lightly pressed MPA electrolyte layer. A second graphite sheet identical to the first sheet was then placed in the die on top of the C-1-M mix and the second steel pellet was placed on top of the graphite sheet and the entire cell heavily pressed in a vice. The resulting composite pellet consisted of five distinct layers: graphite sheet, A-1-M, MPA, C-1-M, and graphite sheet. This composite pellet was easily and cleanly removed from the press die as a single unit and was ready for use.

The battery cell made in the foregoing manner had an open circuit potential of +0.584 volts (close to the theoretical voltage for the hydroquinone/quinone: $MnO_2$ couple in acid electrolyte of +0.551 volts). This is a good indication that the following reactions occur in the cell:

anode: $H_2Q \leftrightharpoons Q+2H^++2e^-$ cathode: $MnO_2+H^++e^- \leftrightharpoons MnOOH$ where $H_2Q$ represents hydroquinone and Q represents quinone. The battery cell was then discharged for 17 hours on a resistive load of 8 kiloohms. The working voltage remained above +0.4 volts during this time. The cell was then charged by 1.550 volts dropped across a 100 kiloohm resistor for 8 hours. At the end of charging the voltage was about +0.726 volts. The cell was then discharged in the same resistive load for 15 hours and then recharged for six days to a voltage of +1.018 volts, following which it was again discharged for a third time on the same resistive load.

EXAMPLE 2

A three cell bipolar battery was constructed using the same procedure as in Example 1. The anode mix (A-2-M) consisted of 350 mg A-1 mixed with 150 mg of MPA. Thus, the A-2-M mix contained by weight 56% HQ, 14% graphite and 30% MPA.

The cathode mix (C-2-M) consisted of 350 mg of C-1 mixed with 150 mg of MPA. Thus the C-2-N mix consisted by weight of 63% $MnO_2$, 7% graphite and 30% MPA. The order of the construction was the same as in Example 1. After the graphite sheet had been placed on top of the C-2-M mix, the order was repeated twice more in order to build a three cell battery in the plastic die. The graphite sheets between the cells acted as a bipolar current collector.

The open circuit voltage of the battery was +1.66 volts, or +0.553 volts per cell. This battery was discharged and charged as in Example 1.

EXAMPLE 3

This Example illustrates how the cell components can be screen-printed instead of being formed as pressed powders. A mixture was formed from 6 g of white plastic glue, 2 g of deionized water, 0.4 g of carbon powder and 3.5 g of $MnO_2$ powder until homogeneous. This mixture was then spread on a polyester sheet as a thin layer and allowed to dry in air at room temperature for about half an hour. The resulting electrode was peeled off the polyester sheet and was found to have a resistivity of 5–12 ohms per square centimeter across its thickness of about 0.1 mm.

In place of the white plastic glue, other glues and epoxy resins can be used. Graphite, or other types of conductive additives, can be used instead of, or in addition to, the carbon.

EXAMPLE 4

Electrodes were prepared as in Example 3 using 7 g of white plastic glue, 3 g of deionized water, 1 g of $MnO_2$ and 0.8 g of carbon. The resulting electrode had a thickness resistivity of 1–2 ohms per square centimeter across its thickness of about 0.1 mm.

EXAMPLE 5

Using the procedure described in Example 1, two cells were constructed using a cathode mix consisting by weight of 36% $WO_3$, 6% graphite and 58% solid MPA. The remainder of the cell was as in Example 1. The open circuit voltages of the two cells were 0.098 and 0.120 volts, respectively. The cells showed only slight polarization on a 150 ohm load indicating that the system had good rate capability. This Example particularly shows that the hydroquinone anode mix is a high rate electrode and that the MPA is capable of supporting large currents. The reaction at the cathode in this Example was:

$WO_3+xH^++xe^- \leftrightharpoons H_xWO_3$

EXAMPLE 6

The procedure of Example 1 was repeated substituting carbon black for the graphite in the cathode mix. This provided a cell with a flatter discharge voltage profile than in comparable cells using graphite as the conductive additive in the cathode mix. The same weight per cent in the composition of $MnO_2$ and MPA electrolyte was used as in Example 1 giving: 38% $MnO_2$, 4% carbon black and 58% MPA. The remainder of the cell had an open circuit voltage of 0.533 volts. During discharge on the same drain as in Example 1, the voltage curve profile was flatter than cells containing graphite in the cathode mix. A flatter profile has the desirable properties of lower cell polarization, greater energy density and higher average voltage. When discharge had been terminated, the cell was recharged using the same conditions as in Example 1.

EXAMPLE 7

A cell was produced substituting the hydroquinone in the anode mix by methylene blue (MB). The composition of the anode mix in weight per cent was: 28% MB, 14% graphite and 58% MPA. The remainder of the cell was as described in Example 1. The open circuit voltage of the cell was 0.483 volts. The cell was discharged and charged using the conditions of Example 1.

EXAMPLE 8

A cell was produced using acetaminophen in place of hydroquinone. A mixture consisting of 75 weight per cent acetaminophen and 25% of providone, starch and stearic acid (mixture X). Mixture X was blended with graphite and MPA solid electrolyte in the following weight per cent: X 33%, graphite 8% and MPA 59%. The resulting anode mix was used as the anode in a cell constructed in the manner described in Example 1. The open circuit voltage of this cell was 0.423 volts. The cell was capable of being discharged using the conditions of Example 1.

EXAMPLE 9

In this Example the cell composition was the same as in Example 1, but instead of circular pellets, the powders were compacted in layer form between graphite sheets into an asymmetric shape, which had the advantage that it could be inserted with only one side (that is polarity) into the receiving form. This is useful because it prevents mistakes in the orientation of the polarity of the battery on the device in which the battery is to be used. It is also useful since asymmetric receiving forms can be designed to receive battery power sources. The discharge behavior of this cell was the same as the cell of Example 1. When discharge had terminated, the cell was charged at much higher currents than in Example 1, the charging voltage being 1.521 volts dropped across a 22 kiloohm resistor. The cell was able to accept this fast charge mode and thereafter be usefully discharged.

EXAMPLE 10

In this Example 800 mg of hydroquinone were dissolved in 10 cc of deionized water containing 1.4 g of MPA. The pH of the plain MPA solution was about 1. Upon the addition of the hydroquinone, the solution turned from its yellowish color to dark greenish blue. 8 cc more of deionized water were added to this solution which was then heated on a hot plate at 37° C. with stirring. When nearly all of the water had evaporated, the stirring was terminated and the solution was allowed to dry to completion. The resulting dry material (Y) was dark blue. An anode mix containing in weight per cent: 33% Y, 8% graphite and 59% MPA, was used to construct a cell as in Example 1. This cell had an open circuit voltage of 0.455 volts and was usefully discharged under the conditions described in Example 1.

EXAMPLE 11

A battery cell was constructed as in Example 1, except that in the cathode mix, the $MnO_2$ was replaced by naphthalene. The open circuit voltage of the resulting cell was about 0.185 volts.

EXAMPLE 12

A cell was constructed using the anode, electrolyte and cathode compositions as in Example 1, but the graphite foil end plate, anode mix, electrolyte, cathode mix and graphite foil end plate were pressed sequentially inside a flexible plastic tube to form a bipolar battery. The bipolar current collector was the graphite foil as in Example 2. In this manner, a multi-cell battery was constructed having an open circuit voltage which was the sum of the individual cell voltages. In this way batteries with voltages of greater than 2 volts were prepared. Individual cell voltages were of the order of 0.565 volts. The advantage of using a flexible plastic tube for the battery housing was that the battery was flexible.

EXAMPLE 13

A flexible tube battery was assembled as in Example 12, except that the cathode mix was replaced by the naphthalene cathode mix of Example 11. A bipolar battery was obtained, the open circuit voltage of which was the sum of the individual cells.

EXAMPLE 14

A battery cell was constructed as in Example 1, except that the molybdophosphoric acid (MPA) was replaced by tungstophosphoric acid (TPA) in the anode and cathode mixes and solid electrolyte. The weight per cent composition in the anode and cathode mixes was the same, but the amount of TPA used for the electrolyte was 493 mg. The open circuit voltage of this cell was 0.591. It was discharged using the same conditions as in Example 1 to provide useful energy.

EXAMPLE 15

The procedure described in Example 1 was repeated to prepare cells. The anode mix consisted of the following weight percentages: 33.3% THQ, 8.3% MPA and 58.3% graphite powder. The cathode consisted of 75% electrolytic manganese dioxide, 21% MPA and 4% graphite powder. The typical particle diameter of the graphite powder was about 6 microns. The insulating sleeve of the 12 mm diameter die in this example is anodized aluminum. The anodizing treatment created a highly electrically insulating and smooth layer on the surface of the aluminum die block. Cells were pressed at one ton.

Typical open circuit voltages of cells with the above composition are about −0.790 to +0.780 volts. Such cells were discharged on continuous drains across resistive loads corresponding to current densities in the range from 0.13 to 7 mA per square centimeter with working voltages of about 0.720 to 0.550 volts, respectively. Pulse current densities of 9 mA per square centimeter at voltages greater than +0.400 volts can be achieved with this cell. Repeated discharge-charge cycles were performed with the charging performed by dropping 1.5 volts across a 16 kiloohm resistor in series with the cell.

EXAMPLE 16

An eight cell bipolar battery was constructed with cells built according to those in Example 15. In this case, cell shape was rectangular. Graphite sheets between the cells acted as a bipolar connector.

EXAMPLE 17

It is known from the prior art that the conductivity of the MPA electrolyte is dependent on the amount of hydrated water molecules contained in its crystal structure. At typical room conditions some of this water may be lost from the MPA. In order to prevent this, cells built in accordance with Example 15 were sealed around their periphery to prevent possible water loss. Sealing the periphery of cells can be accomplished either by water impermeable film barriers such as by the commercial product which is sold under the trade name "Parafilm" or appropriate glues, lacquers, or polymer solutions which, when dried or polymerized, act to prevent water loss. In this way, water loss was essentially eliminated from the MPA electrolyte constructed into the cells.

EXAMPLE 18

Further to Example 17, a proton conducting water impermeable barrier or sealant can be introduced into the heteropolyacid electrolyte directly. In one version, a Nafion solution is mixed with the solid electrolyte powder mix and then the Nafion is allowed to set up. The Nafion acts as a water barrier around the powder grains to prevent water loss.

In other versions, other sealants can be dry-mixed with the electrolyte powder to coat the powder grains. In yet other variations, the Nafion was applied to the external faces of pressed pellets of the electrolyte to prevent water loss.

EXAMPLE 19

Cells can be made according to the various methods described in Examples 15–18, such as, but not limited to, those described in Examples 1–14. In order to build battery packs consisting of a number of cells it is desirable to fill all the available volume within the pack with cells without any unused space. In order to do this, since some packs have unusual shapes, the size and shape of the cells need to conform to the internal dimensions of the pack. In order to do this, cells can be cut into the desired shapes. The cutting needs to be performed without short circuiting the cells. For instance, a blade which is not electrically conductive can be used, laser or other types of energy beams, or other methods. This eliminates the need for a range of dies for each individual shape cell and facilitates mass production of various shaped batteries.

EXAMPLE 20

Some of the organic compounds described herein for anode active materials might move towards the cathode thorough the electrolyte and cause some degree of self-discharge. In order to prevent this, the active materials can be set in polymers or polymerized to prevent their movement through the electrolyte. Separator barriers such as, but not limited to, those based on cellophane can also be inserted into the electrolyte to prevent migration.

EXAMPLE 21

In order to catalyze the protonic reaction at the anode during discharge and charge of the cell, various catalysts can be added to the anode mix. For instance, a 10% palladium hydrogenation catalyst on activated carbon can be added to the anode mix. For one skilled in the art, it is apparent that other catalysts can also be chosen.

EXAMPLE 22

Further to Example 17, hygroscopic materials can be mixed with the acid electrolyte in order to minimize loss of hydrated water from the heteropolyacid. In this way, the hydrated water of the heteropolyacid is maintained. In one version, a hygroscopic salt such as calcium chloride was mixed with the heteropolyacid. One skilled in the art would be able to envision many other hygroscopic materials which one can use for this purpose.

EXAMPLE 23

As an example of a cathodic active material with perovskite sub-structures, a cell was built as in Example 15 except that the cathode consisted of 38 weight per cent $Bi_2Sr_2Cu_1O_{6+y}$ obtained from SSC Inc, 58 w/o MPA, and 4 w/o graphite powder. The initial open circuit was low, only 0.285 volts, and so :no further measurements were conducted.

EXAMPLE 24

As an example of a cell whose anode contains a non-aromatic ring proton donating compound, a cell was built and discharged as in Example 15 except that the active anodic material consisted of Quinic acid. The initial open circuit voltage was 0.502 volts. Discharge under these conditions led to fast polarization of the cell voltage.

EXAMPLE 25

As another example of a cell whose anode contains a non-aromatic ring proton donating compound, a cell was built as in Example 15 except that the active anodic material consisted of scyllo-Inosose. The initial open circuit voltage was 0.515 volts. No further measurements were conducted.

EXAMPLE 26

As an example of a cell whose anode contains a chain proton donating compound, a cell was built as in Example 15 except that the active anodic material consisted of Mucic acid. The initial open circuit voltage was 0.524 volts. No further testing was performed.

EXAMPLE 27

As another example of a cell whose anode contains a chain proton donating compound, a cell was built and discharged as in Example 15 except that the active anodic material consisted of meso-erythritol. The initial open circuit voltage was 0.528 volts. Discharge under these conditions led to fast polarization of the cell voltage.

EXAMPLE 28

Hexahydroxy benzene was synthesized using standard chemical procedures as described in "Organic Syntheses, Collective Volume 5", John Wiley and Sons, New York, pp. 595–7. Cells were built as in Example 15 with hexahydroxy benzene as the active anodic material. The open circuit voltage is 0.9 volts. Cells were discharged at about 0.7 mA per square centimeter. The discharge curve was slightly sloping to 0.6 volts to give useful energy and thereafter fell off more quickly.

EXAMPLE 29

As an example of a cell whose anode contains a 4-membered aromatic ring proton donating compound, a cell was built and discharged as in Example 15 except that the active anodic material consisted of 75 w/o squaric acid. The initial open circuit voltage was 0.556 volts. Discharge under these conditions led to fast polarization of the cell voltage.

EXAMPLE 30

As an example of a cell whose cathode contains a non-proton accepting compound containing a metal ion whose cation can assume at least two different non-zero oxidation numbers, cells were built as in Example 15 except that the active cathodic material consisted of 87.5 w/o $MnSO_4$-1 $H_2O$, 8.5 w/o MPA and 4 w/o Texas Shawinigan carbon black. The cells were first charged at 2 mA current and then discharged at room temperature on the following loads. Capacity data is given below:

| Load, ohms | Capacity, mAH | C rate |
|---|---|---|
| 1,000 | 7.6 | 0.13 |
| 500 | 7.3 | 0.26 |
| 237 | 6.8 | 0.53 |
| 100 | 5.6 | 1.32 |

The effect of temperature was evaluated for cells charged as above and discharged on 1,000 ohms.

| Temperature, degrees Celsius | Capacity, mAH |
| --- | --- |
| 4 | 7.1 |
| 22.5 | 7.6 |
| 55 | 4.3 |

The effect of charging rate was evaluated for cells discharged on 1,000 ohms at room temperature.

| Charging current | C rate | Capacity, mAH |
| --- | --- | --- |
| 0.5 | 0.07 | 7.8 |
| 2 | 0.26 | 7.6 |
| 4.75 | 0.63 | 8.0 |
| 6 | 0.79 | 6.4 |
| 9.45 | 1.24 | 4.2 |

At the C/8 discharge rate, cells provided 370 partial discharge cycles without exceeding more than 20% capacity fade relative to the initial capacity.

EXAMPLE 31

As an example of a cell whose cathode contains fullerenes, a cell was built and discharged as in Example 15 except that the active cathodic material consisted of the C-65fullerite. The resulting open circuit voltage was quite low: 0.119 volts.

EXAMPLE 32

Cells were built with cathodes as in Example 15 except that the active cathodic material consisted of $Ni(OH)_2$. Cell anodes were either tetrahydroxyquinone or rhodizonic acid (both in dihydrate form). The cells were first charged at 2.28 mA current and then discharged. The purpose of the charging was to convert the $Ni(OH)_2$ to $NiOOH$, and the tetrahydroxyquinone (THQ) or rhodizonic acid (RDZ) to hexahydroxy benzene (HHB). Results are given below:

| Anode | Hours of Charging | Post-charge OCV |
| --- | --- | --- |
| THQ | 4.1 | 1.088 |
| THQ | 4.1 | 1.286 |
| RDZ | 8.3 | 1.225 |
| RDZ | 8.3 | 1.170 |

Cells discharged above 1 volt on 1,000 ohms load.

EXAMPLE 33

Cells were built and tested as in Example 30 with cathodes of $MnSO_4$-1 $H_2O$ and triquinoyl as the active anode material. Initial charging was performed at 2 mA to obtain the indicated anode reaction product and then cells were discharged across a 1,000 ohm load. Results are given below. Anodic product abbreviations are defined in Example 32.

| Nominal electron change | Intended anodic product | Discharge mAH | avg. CCV |
| --- | --- | --- | --- |
| 2 | RDZ | 6.2 | 0.9 volts |
| 4 | THQ | 6.7 | 0.9 volts |
| 6 | HHB | 6.9 | 0.9 volts |

EXAMPLE 34

Cells were built and tested as in Example 33 using RDZ as the active anodic material. Results are summarized below.

| Nominal electron change | Intended anodic product | Discharge mAH | avg. CCV |
| --- | --- | --- | --- |
| 2 | THQ | 7.7 | 0.85 volts |
| 4 | HHB | 8.2 | 0.85 volts |

EXAMPLE 35

As an example of a cell whose anode contains a non-proton donating compound containing a metal ion whose cation can assume at least two different non-zero oxidation numbers, cells were built with a THQ active material cathode and $SnSO_4$ active material anode. The open circuit voltage was about 0.2 volts.

EXAMPLE 36

Cells were built as in Example 30 but with 7 w/o of $MnSO_4$-1 $H_2O$ substituted with $Bi_2O_3$. Cells were discharged at 0.13 C rate to 16% depth of discharge and charged at 0.26 C rate. After 51 cycles there was only a 7% capacity fade from the initial capacity.

EXAMPLE 37

As an example of a cell which contains an aqueous solution of an acid as the proton conducting additive to the electrodes and a membrane form electrolyte, cells were built with the following construction. The anode composition is: 69 w/o THQ, 16 w/o Shawinigan carbon black, 15 w/o 1N sulphuric acid. The cathode composition is: 85 w/o $MnSO_4$-1 $H_2O$, 8 w/o Shawinigan carbon black, 7 w/o 1N sulphuric acid. Due to the high surface area of the carbon, the electrode mixes remain as free flowing powders with a dry appearance. The electrolyte was formed by dissolving TPA in an aqueous poly-vinyl alcohol solution and casting it into a thin film. The anode and cathode mixes were pressed against the electrolyte film to make the cell. The initial charge was carried out at the 0.1 C rate and then discharged at the 0.05 C rate. The energy density under these conditions ranged between 140 and 180 watt-hours/liter.

EXAMPLE 38

As another example of a cell which contains an aqueous solution of an acid as the proton conducting additive to the electrodes and a membrane form electrolyte, cells were built as in Example 37 with the following composition. The anode composition is a 1:1 by weight mixture of THQ/Shawinigan carbon black wetted with an aqueous solution of sulphuric acid. The cathode composition is a 3:1 by weight mixture of $MnSO_4$-1 $H_2O$/Shawinigan carbon black wetted with an aqueous solution of sulphuric acid. The electrolyte membrane is a chloro-sulfonated polyethylene. Cells were charged and fully discharged at the 0.3 C rate. The discharge voltage was flat and remained above 1 volt for about 80% of the depth of discharge. Cells discharged at the 1 C rate gave high capacities.

EXAMPLE 39

Cells were built as in Example 38 but with cathodes whose active material was substituted by 10 w/o of a strong cation form exchanger powder in the hydrogen ion form. It is sold commercially as Dowex 50WX8. This cathode composition gives improved cycling behavior.

EXAMPLE 40

As another example of a cell whose cathode contains a non-proton accepting compound containing a metal ion whose cation can assume at least two different non-zero oxidation numbers, a cell was built as in Example 30 except that the active cathodic material consisted of $Ce_2(SO_4)_3$. After the initial charge, the open circuit voltage was 0.575 volts. No further tests were performed.

While the invention has been described with respect to a limited number of embodiments, it will be appreciated that many variations, modifications and other applications of the invention may be made.

What is claimed is:

1. A battery comprising an anode, a cathode and a solid state electrolyte between, and in contact with, the anode and cathode, wherein:

(a) the anode includes an organic compound which is a source of protons during discharge;

(b) the cathode includes a compound which forms an electrochemical battery couple with the anode; and (c) the electrolyte includes a solid material in which protons are mobile.

2. A battery as in claim 1, wherein the anode is selected from the group of organic compounds consisting of hydroquinone, phloroglucinol, echinochrome, 1,2,5,8-tetrahydroxyanthraquinone, purpogallin, methylenedigallic acid, 2,5-dihydroxy-1,4-benzoquinone, resorcinol, ascorbic acid and its derivatives; tetrahydroxy napthalene, tetrahydroxy 1,4-naphthaquinone, pentahydroxy 1,4-naphthaquinone, phenolphthalein, indophenol, bromophenol blue, oxindole, o-phenanthroline, phenanthridine, 6(5H)-phenanthridinone, uracil, 2-amino-5-bromopyridine, 5-aminotetrazole monohydrate, 2-aminothiazole, 2-aminopyrimidine, 2-amino-3-hydroxy-pyridine, 2,4,6-triaminopyrimidine, 2,4-diamino-6-hydroxy pyrimidine, 5,6-diamino-1,3-dimethyluracil hydrate, 5,6-diamino-2-thiouracil, cyanuric acid, cyanuric acid compound with melamine, 1,2-diaminoanthraquinone and 3-amino-2-cyclohexen-1-one, methylene blue, hydroxy acetophenone, acetaminophen, hydroxybenzyl alcohol, dopamine, pyrogallol, naphthols, anthranol, hydroxy anthraquinone, anthralin, anthragallol, anthrarufin, anthrobin, purpurin, tetrahydroxybenzophenone, 1,8,9-anthracenetriol, carminic acid, hydroquinone monomethyl ether, citrazinic acid, hydroxybenzophenone, hydroxy biphenyl, tetrahydro papaveroline, fustin, hydroquinone monobenzylether hydroxymethyl pyridine, squaric acid, tetrahydroxy acetophenone, tetrahydroxy benzoic acid, Rhodizonic acid, croconic acid, hexahydroxy benzene, reductic acid, 5-methyl reductic acid, calix(4)arene, chloranilic acid and tetrahydroxy quinone.

3. A battery as in claim 1, wherein said organic compound of said anode is selected from the group consisting of the non-hydrated and the hydrated forms of those compounds.

4. A battery as in claim 1, wherein said compound of said cathode is selected from the group consisting of the non-hydrated and the hydrated forms of those compounds.

5. A battery as in claim 1, wherein the anode is selected from the group consisting of tetrahydroxy quinone, hexahydroxybenzene, chloranilic acid and rhodizonic acid.

6. A battery as in claim 1, wherein the anode includes a proton-donating non-aromatic ring compound.

7. A battery as in claim 6, wherein the anode includes pentahydroxy cyclohexanon-thiosemicarbazon, pentahydroxy cyclohexanon diethyl thioacetal, 2,3,5,6 tetrahydroxy cyclohexane-1,4 dione, tri-keto-tri-hydroxy cyclohexane, inositol, scyllo-Inosose, uramil, urazole, chloroanilic acid, quinic acid, octahydroxy cyclobutane.

8. A battery as in claim 1, wherein the anode includes a solid state proton-donating chain compound.

9. A battery as in claim 8, wherein the anode includes mucic acid and meso-erythritol.

10. A battery as in claim 1, wherein the cathode includes a compound selected from the group consisting of transition metal dichalcogenides, NiOOH, naphthalene, $Ni(OH)_2$, monovalent silver oxide, divalent silver oxide, tantalum oxide, molybdenum trioxide, niobium triselenide, $Bi_2Sr_2CaCu_2O_{8+y}$, $Bi_2Sr_2Cu_1O_{6+y}$, $YBa_2Cu_3O_7$, fullerenes, triquinoyl (also known as hexaketocyclohexane and cyclohexane-hexone) in its non-hydrated, hydrated, dihydrate and octahydrate forms, leuconic acid in its non-hydrated, hydrated and pentahydrated forms, pseudothiohydantoin, 3-sulfolene, uric acid, hydantoin, barbituric acid, glycine anhydride, 2,4-thiazolidinedione, thioxanthen-9-one, 5-nitro-uracil, glutarimide, parabanic acid, 1,5-dihydropyrimidol-[5,4-d]-pyrimidine-2,4,6,8(3H, 7H)-tetrone, thiotetronic acid, 2,4,6 triaminopyrimidine, o-phenanthroline monohydrate, dehydro ascorbic acid dimer, 1,3 dichloro-5,5 dimethyl hydantoin, anthraquinone, quinone, anthracene, dichloromaleic anhydride, 3,5,dinitro benzoic acid, tetrachlorophthalic anhydride, chloranil, 2-ethyl anthraquinone or other alkyl anthraquinones, duroquinone, succinimide, 2,3-dichloro 5,6-dicyano 1,4-benzoquinone, 4(6)-amino uracil, hydrindantin, alkali metal salts of rhodizonic acid and tetrahydroxyquinone, tri-chloro cyanuric acid, cyanuric chloride, cyanuric acid anhydrous, di-chloro isocyanuric acid, di-chloro isocyanuric acid lithium, potassium or sodium salt, trichloro isocyanuric acid, trichloromelamine, hexachloromelamine, N-chloro-succinimide, succinimide, succinic anhydride, m-dinitrobenzene, 2,4-dinitrophenol, picric acid, 4-nitrosophenol, p-quinonedixime, dichlorobenzoquininediimine, N,N-dichloro-dimethylhydantoin or other N-halogen organic compounds or other aromatic nitro compounds, substituted biureas or substituted azodicarbonamides.

11. A battery as in claim 1, wherein said material in which protons are mobile is selected from the group consisting of a heteropolyacid, an anion exchanger which does not block protons, an anion adsorber which does not block protons, a cation adsorber, a cation exchange material, including their hydrogen ion forms, chloro-sulfonated polyethylene, sulfonated polystyrene, sulfonated polysulfones and copolymers based on these materials, a perfluoronated sulfuric acid cation exchanger, cellulose acetate or cellulose triacetate membrane.

12. A battery as in claim 1, wherein the cathode includes manganese sulphate and carbon, and wherein the anode includes chloranilic acid and carbon.

13. A battery as in claim 12, wherein said manganese sulphate is selected from non-hydrated manganese sulphate and hydrated manganese sulphate, and wherein said chloranilic acid is selected from non-hydrated chloranilic acid and hydrated chloranilic acid.

14. A battery as in claim 1, wherein said cathode includes $MnSO_4$-x $H_2O$, where x is an integer in the range of from 0 to 7.

15. A battery as in claim 1, wherein said cathode includes $MnSO_4$-x $H_2O$, where x is zero or one.

16. A battery as in claim 1, wherein said cathode compound includes a metal whose cation can assume at least two different non-zero oxidation numbers.

17. A battery as in claim 16, wherein said cathode compound includes a metal cation M where M is selected from the group consisting of Mn, Ce, Fe, or Co.

18. A battery as in claim 16, wherein the cathode further includes a material selected from the group consisting of a cation exchange material and a cation adsorber material.

19. A battery as in claim 16, wherein said cathode compound selected from the group consisting of cation exchange material and cation adsorber material is treated with a solution of Mn, Ce, Fe or Co salts.

20. A battery as in claim 1, wherein a material which does not block proton transport selected from the group consisting of an ion exchange material and an ion adsorber material is positioned in an inter-layer between the anode and the cathode.

21. A battery as in claim 1, wherein the organic compound contained in the anode has both proton-donating and proton-accepting groups.

22. A battery as in claim 1, wherein said cathode compound can function as a proton-donator and a proton-acceptor.

23. A battery as in claim 1, wherein the anode and cathode further contain an aqueous acid solution.

24. A battery comprising an anode, a cathode, and a solid state electrolyte between, and in contact with, the anode and cathode, wherein:

(a) the anode includes a material which includes a metal whose cation can assume at least two different non-zero oxidation numbers;

(b) the cathode includes a material which includes a compound which forms an electrochemical battery couple with the above anode, said compound being $MnSO_4$-x $H_2O$, where x is an integer in the range of from 0 to 7; and (c) the electrolyte includes a solid in which protons are mobile.

25. A battery as in claim 24, wherein the cathode includes a compound selected from the group consisting of transition metal dichalcogenides, NiOOH, naphthalene, $Ni(OH)_2$, monovalent silver oxide, divalent silver oxide, tantalum oxide, molybdenum trioxide, niobium triselenide, $Bi_2Sr_2CaCu_2O_{8+y}$, $Bi_2Sr_2Cu_1O_{6+y}$, $YBa_2Cu_3O_7$, fullerenes, triquinoyl (also known as hexaketocyclohexane and cyclohexane-hexone) in its non-hydrated, hydrated, dihydrate and octahydrate forms, leuconic acid in its non-hydrated, hydrated and pentahydrated forms, pseudothiohydantoin, 3-sulfolene, uric acid, hydantoin, barbituric acid, glycine anhydride, 2,4-thiazolidinedione, thioxanthen-9-one, 5-nitro-uracil, glutarimide, parabanic acid, 1,5-dihydropyrimidol-[5,4-d]-pyrimidine-2,4,6,8(3H, 7H)-tetrone, thiotetronic acid, 2,4,6 triaminopyrimidine, o-phenanthroline monohydrate, dehydro ascorbic acid dimer, 1,3 dichloro-5,5 dimethyl hydantoin, anthraquinone, quinone, anthracene, dichloromaleic anhydride, 3,5,dinitro benzoic acid, tetrachlorophthalic anhydride, chloranil, 2-ethyl anthraquinone or other alkyl anthraquinones, duroquinone, succinimide, 2,3-dichloro 5,6-dicyano 1,4-benzoquinone, 4(6)-amino uracil, hydrindantin, alkali metal salts of rhodizonic acid and tetrahydroxyquinone, tri-chloro cyanuric acid, cyanuric chloride, cyanuric acid anhydrous, di-chloro isocyanuric acid, di-chloro isocyanuric acid lithium, potassium or sodium salt, trichloro isocyanuric acid, trichloromelamine, hexachloromelamine, N-chloro-succinimide, succinimide, succinic anhydride, m-dinitrobenzene, 2,4-dinitrophenol, picric acid, 4-nitrosophenol, p-quinonedixime, dichlorobenzoquininediimine, N,N-dichloro-dimethylhydantoin or other N-halogen organic compounds or other aromatic nitro compounds, substituted biureas or substituted azodicarbonamides.

26. A battery as in claim 24, wherein said material in which protons are mobile is selected from the group consisting of a heteropolyacid, an anion exchanger which does not block protons, an anion adsorber which does not block protons, a cation adsorber, a cation exchange material, including their hydrogen ion forms, chloro-sulfonated polyethylene, sulfonated polystyrene, sulfonated polysulfones and copolymers based on these materials, a perfluoronated sulfuric acid cation exchanger, cellulose acetate or cellulose triacetate membrane.

27. A battery as in claim 1, wherein the anode includes a quinone.

28. A battery as in claim 24, wherein said cathode includes $MnSO_4$-x $H_2O$, where x is zero or one.

29. A battery as in claim 24, wherein said anode material includes a metal cation M where M is selected from the group consisting of Sn, Ti, Cu and Cr.

30. A battery as in claim 24, wherein said anode material is selected from the group consisting of the non-hydrated and the hydrated forms of those compounds.

31. A battery as in claim 24, wherein said cathode material includes a metal whose cation can assume at least two different non-zero oxidation numbers.

32. A battery as in claim 24, wherein said cathode material includes a metal cation M where M is selected from the group consisting of Mn, Ce, Fe, and Co.

33. A battery as in claim 24, wherein the anode further includes a material selected from the group consisting of a cation exchange material and a cation adsorber material.

34. A battery as in claim 24, wherein a material which does not block proton transport selected from the group consisting of an ion exchange material and an adsorber material is positioned in an inter-layer between the anode and the cathode.

35. A battery as in claim 31, wherein the cathode further includes a material selected from the group consisting of a cation exchange material and a cation adsorber material.

36. A battery as in claim 31, wherein said cathode includes a material selected from the group consisting of cation exchange material and cation adsorber material treated with a solution of Mn, Ce, Fe or Co salts.

37. A battery as in claim 24, wherein said anode includes a material selected from the group consisting of cation exchange material and cation adsorber material treated with a solution of Sn, Cu, Ti and Cr salts.

38. A battery comprising an anode, a cathode, and a solid state electrolyte between, and in contact with, the anode and cathode, wherein:

(a) the anode includes a material which includes a metal whose cation can assume at least two different non-zero oxidation numbers;

(b) the cathode includes a compound which forms an electrochemical battery couple with the above anode;

(c) the electrolyte includes a solid in which protons are mobile; and (d) the cathode and anode contain an aqueous acid solution.

39. A battery as in claim 38, wherein said cathode compound is selected from the group consisting of the non-hydrated and the hydrated forms of those compounds.

40. A battery as in claim 38, wherein said cathode compound can function as a proton-donator and a proton-acceptor.

* * * * *